United States Patent
Rector et al.

(10) Patent No.: US 10,453,090 B2
(45) Date of Patent: Oct. 22, 2019

(54) METHODS AND SYSTEMS FOR AUTOMATED COUPON PROCESSING

(71) Applicant: Walmart Apollo, LLC, Bentonville, AR (US)

(72) Inventors: Mindy Rector, Bentonville, AR (US); Brenda Deal, Rogers, AR (US); Cynthia Marie Scholtes Kennedy, Pea Ridge, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 951 days.

(21) Appl. No.: 13/755,844

(22) Filed: Jan. 31, 2013

(65) Prior Publication Data
US 2014/0214514 A1 Jul. 31, 2014

(51) Int. Cl.
G06Q 30/00 (2012.01)
G06Q 30/02 (2012.01)

(52) U.S. Cl.
CPC ..... G06Q 30/0248 (2013.01); G06Q 30/0238 (2013.01)

(58) Field of Classification Search
CPC .................................................. G06Q 30/0248
USPC ...................................................... 705/14.26
See application file for complete search history.

(56) References Cited

U.S. PATENT DOCUMENTS 5,424,524 A 6/1995 Ruppert et al.
6,618,683 B1 9/2003 Berstis et al.
7,240,843 B2 * 7/2007 Paul .................. G06Q 20/341 235/383
7,347,361 B2 3/2008 Lovett
7,543,741 B2 6/2009 Lovett
7,810,720 B2 10/2010 Lovett
8,046,257 B2 * 10/2011 Wane .................. G06Q 20/10 705/14.1
8,386,309 B2 * 2/2013 Thibedeau .......... G06Q 20/202 705/14.1
9,070,133 B2 * 6/2015 Thibedeau ............ G06Q 30/02
2006/0047577 A1 3/2006 Dietz et al.
2010/0153209 A1 6/2010 de Rubertis et al.
2011/0140380 A1 6/2011 Ulrich
(Continued)

OTHER PUBLICATIONS

Microsoft Computer Dictionary, Fifth Edition, 2002, Microsoft Press, p. 23.*

(Continued)

Primary Examiner — Matthew T Sittner
Assistant Examiner — Michael I Ezewoko
(74) Attorney, Agent, or Firm — McCarter & English, LLP; David R. Burns

(57) ABSTRACT

A computer-implemented method for processing coupons in a point of sale terminal includes receiving electronic coupon data representing a machine-readable coupon code. The coupon code is associated with a coupon presented by a customer at a retail point of sale. The method further includes receiving electronic coupon validation data representing at least one valid coupon code and/or at least one fraudulent coupon code. The method further comprises determining whether the coupon is valid based on the coupon code and the valid coupon code(s) and/or the fraudulent coupon code(s), and identifying the coupon as accepted or invalid based on the determination of whether the coupon is valid.

13 Claims, 6 Drawing Sheets

(56) References Cited

U.S. PATENT DOCUMENTS

| | | | | |
|---|---|---|---|---|
| 2012/0136698 A1* | 5/2012 | Kent | ............. | G06Q 20/3276 |
| | | | | 705/14.1 |
| 2012/0284107 A1 | 11/2012 | Gernaat et al. | | |
| 2012/0316948 A1* | 12/2012 | Shipley | ............. | G06Q 30/02 |
| | | | | 705/14.23 |
| 2013/0085829 A1* | 4/2013 | Kavis | ............. | G06Q 30/0207 |
| | | | | 705/14.26 |
| 2013/0254114 A1 | 9/2013 | Smith | | |
| 2014/0188658 A1 | 7/2014 | Li et al. | | |

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Computing the Mind, Oxford University Press, Edelman, 2008, pp. xi-36.*
Metaphors We Live By, Lakoff, University of Chicago Press, 1980, pp. ix-55.*
Frame Analysis, Goffman, Northeastern University Press, 1974, pp. 1-39, 301-344.*
International Preliminary Report on Patentability issued in International Application No. PCT/US2014/014043, dated Aug. 4, 2015.
The International Search Report and the Written Opinion of the International Searching Authority on the Internationational Application PCT/US14/14043 dated May 8, 2014.

* cited by examiner

METHODS AND SYSTEMS FOR AUTOMATED COUPON PROCESSING

BACKGROUND

Embodiments of the disclosure relate generally to data processing, and more particularly to methods and systems for automatically processing coupons in retail stores.

Coupons issued by vendors, manufacturers, retailers and others are often used by customers to save money by reducing the price paid for certain products and/or services at the point of sale. For example, when checking out, the customer may present a coupon to the retailer for one or more of the products being purchased. The retailer then reduces the receipt total by the redemption value of the coupon, provided that the coupon has not expired and any other conditions associated with redeeming the coupon have been met. If the coupon is issued by an entity other than the retailer itself, the retailer can recover the redemption value from the issuer of the coupon, often using a clearing house to perform this service. For example, the retailer may send the redeemed coupon to the clearing house, which in turn pays the retailer the redemption amount and separately recovers the payment from the issuer of the coupon.

Coupons are most commonly issued in paper form, and are manually handled and processed by the retailer at the point of sale, as well as in a back office, for verification, accounting, auditing and other purposes. For example, some paper coupons may need to be visually verified and/or manually keyed in by a store clerk, tasks that are not always done consistently or reliably. In addition to verifying expiration dates and redemption conditions, some retailers are also vigilant in identifying fraudulent or counterfeit coupons at the point of sale, because if a coupon is discovered to be fraudulent or counterfeit after the sales transaction is complete, the retailer may have no recourse against the customer. Also, paper coupons may be manually sorted, counted, verified and/or keyed into an accounting register in the back office, which can introduce errors, discrepancies, and other inefficiencies. Since some large retailers may process thousands or tens of thousands of paper coupons per day, processing inefficiencies can be compounded by the volume.

SUMMARY

According to an embodiment, a computer-implemented method for processing coupons in a point of sale terminal, where the computer includes a processor, includes receiving, by the processor, electronic coupon data representing a machine-readable coupon code associated with a coupon presented by a customer at a retail point of sale. The method further includes receiving, by the processor, electronic coupon validation data representing at least one of a plurality of valid coupon codes and/or at least one of a plurality of fraudulent coupon codes. The method further includes determining, by the processor, whether the coupon is valid based on the coupon code and at least one of the valid coupon codes and/or at least one of the fraudulent coupon codes, and identifying, by the processor, the coupon as accepted or invalid based on the determination of whether the coupon is valid.

In some embodiments, the computer-implemented method may further include determining, by the processor, whether the coupon is fraudulent based on the plurality of fraudulent coupon codes, and identifying, by the processor, the coupon as invalid based on the determination of whether the coupon is fraudulent.

In some embodiments, an expiration date may be associated with the coupon. The computer-implemented method may further include determining, by the processor, whether the coupon is expired based on the expiration date and a current date, and identifying, by the processor, the coupon as invalid based on the determination of whether the coupon is expired.

In some embodiments, the computer may further include an operator display operatively coupled to the processor. The computer-implemented method may further include displaying, by the processor via the operator display, a message indicating that the coupon is accepted if the coupon is identified as accepted, and otherwise displaying, by the processor via the operator display, a message indicating that the coupon is rejected.

In some embodiments, the coupon code may include a qualified product code and a coupon redemption value. The computer-implemented method may further include receiving, by the processor, electronic product data representing a product code associated with a product to be purchased by the customer, determining, by the processor, whether the product is qualified based on the product code and the qualified product code, and reducing, by the processor, a receipt total by the coupon redemption value based on the identification of the coupon as accepted and the determination of whether the product is qualified.

In some embodiments, computer-implemented method may further include electronically transmitting, by the processor via a communication network operatively coupled to the processor, redemption data representing the coupon to a remote system associated with at least one of a back office system and a coupon clearing house service. In some embodiments, the computer-implemented method may further include electronically scanning, using a barcode reader operatively coupled to the processor, a barcode in which the coupon code is encoded. In some embodiments, the barcode may include at least one of a UPC-A barcode and a GS1 barcode.

In some embodiments, the coupon validation data may be provided by a coupon validation data service provider.

According to an embodiment, a coupon processing system includes a point of sale terminal including a processor, and a memory operatively coupled to the processor. The memory has stored therein non-transitory computer-executable instructions that when executed by the processor cause the processor to receive electronic coupon data representing a machine-readable coupon code associated with a coupon presented by a customer at a retail point of sale, and receive electronic coupon validation data representing at least one of a plurality of valid coupon codes and/or at least one of a plurality of fraudulent coupon codes. The memory further includes non-transitory computer-executable instructions that when executed by the processor cause the processor to determine whether the coupon is valid based on the coupon code and at least one of the valid coupon codes and/or at least one of the fraudulent coupon codes, and identify the coupon as accepted or invalid based on the determination of whether the coupon is valid.

In some embodiments, the memory may further include non-transitory computer-executable instructions that when executed by the processor cause the processor to determine whether the coupon is fraudulent based on the plurality of fraudulent coupon codes, and identify the coupon as invalid based on the determination of whether the coupon is fraudulent.

In some embodiments, the coupon code may include an expiration date of the coupon. The memory may further include non-transitory computer-executable instructions that when executed by the processor cause the processor to determine whether the coupon is expired based on the expiration date and a current date, and identify the coupon as invalid based on the determination of whether the coupon is expired.

In some embodiments, the system may further include an operator display operatively coupled to the processor. The memory may further include non-transitory computer-executable instructions that when executed by the processor cause the processor to display, via the operator display, a message indicating that the coupon is accepted if the coupon is identified as accepted, and otherwise display, via the operator display, a message indicating that the coupon is rejected.

In some embodiments, the coupon code may include a qualified product code and a coupon redemption value. The memory may further include non-transitory computer-executable instructions that when executed by the processor cause the processor to receive product data representing an electronic product code associated with a qualified coupon product purchased by the customer, determine whether the product is qualified based on the product code and the qualified product code, and reduce a receipt total by the coupon redemption value based on the identification of the coupon as accepted and the determination of whether the product is qualified. In some embodiments, the processor may be operatively coupled to a communication network. The memory may further include non-transitory computer-executable instructions that when executed by the processor cause the processor to electronically transmit, via the communication network, redemption data representing the accepted coupon to a remote system associated with at least one of a back office system and a coupon clearing house service.

In some embodiments, the system may further include a barcode reader operatively coupled to the processor. The memory may further include non-transitory computer-executable instructions that when executed by the processor cause the processor to electronically scan, using the barcode reader, a barcode in which the coupon code is encoded. In some embodiments, the barcode may include a UPC-A barcode and/or a GS1 barcode. In some embodiments, the coupon validation data may be provided by a coupon validation data service provider.

According to an embodiment, a non-transitory computer-readable medium has stored thereon non-transitory computer-executable instructions that when executed by a computer cause the computer to receive electronic coupon data representing a machine-readable coupon code associated with a coupon presented by a customer at a retail point of sale and receive electronic coupon validation data representing at least one of a plurality of valid coupon codes and/or at least one of a plurality of fraudulent coupon codes. The non-transitory computer-readable medium further includes non-transitory computer-executable instructions that when executed by a computer cause the computer to determine whether the coupon is valid based on the coupon code and at least one of the valid coupon codes and/or at least one of the plurality of fraudulent coupon codes, and identify the coupon as accepted or invalid based on the determination of whether the coupon is valid.

In some embodiments, the non-transitory computer-readable medium of claim may further include non-transitory computer-executable instructions that when executed by the computer further cause the computer to determine whether the coupon is fraudulent based on the plurality of fraudulent coupon codes, and identify the coupon as invalid based on the determination of whether the coupon is fraudulent.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to various embodiments, computer-implemented methods, computer-readable media and systems are disclosed for automatically processing coupons redeemed by customers in a retail store. Coupons tendered by a customer at a point of sale terminal can be automatically validated based on various conditions, including the expiration date of the coupon, whether one or more qualifying products have been purchased, and whether the coupon is valid or fraudulent.

Figure 1:
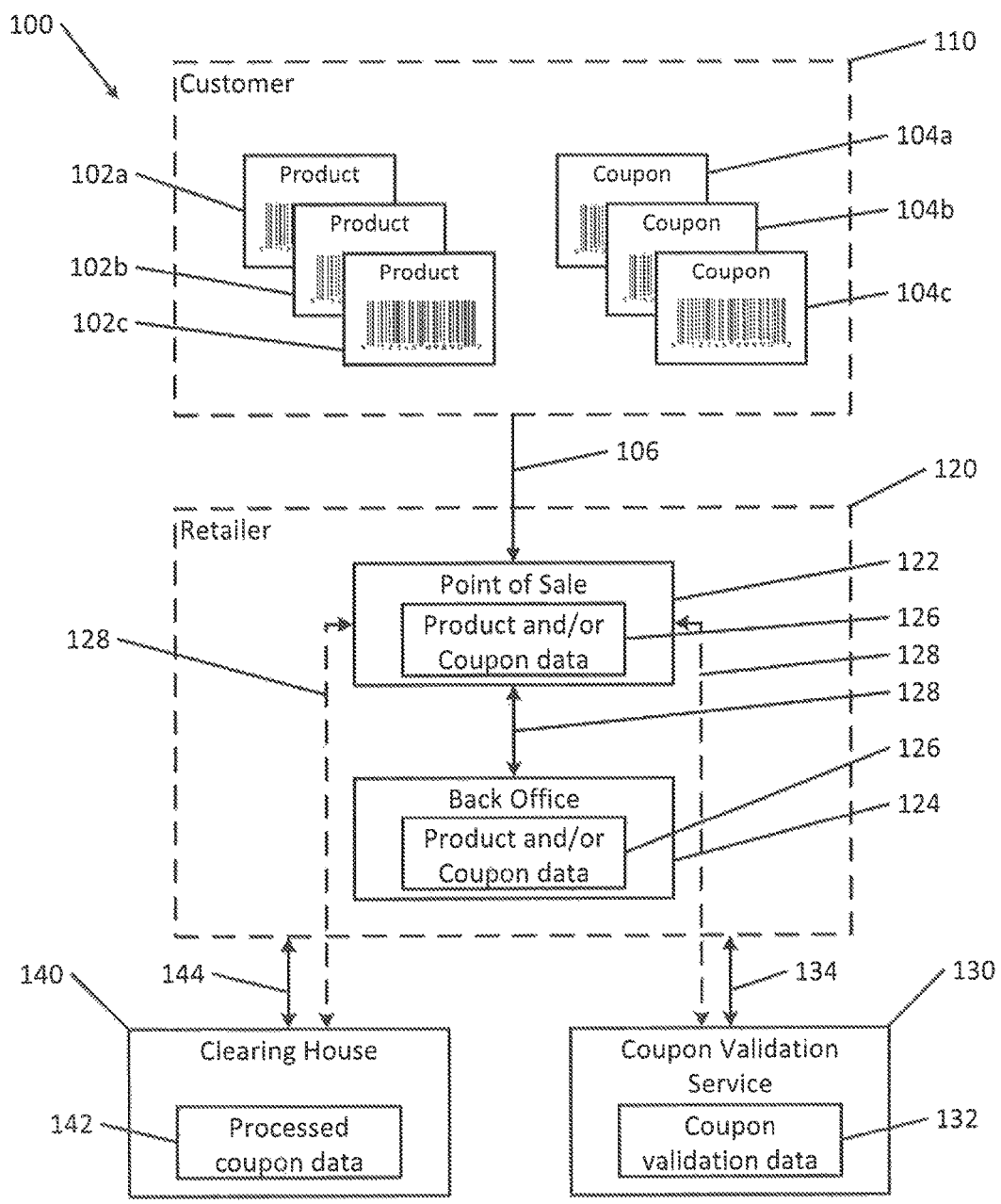
FIG. 1 is a block diagram representing an exemplary overview of a computer-implemented process for automatically processing coupons in accordance with some embodiments.

FIG. 1 is a block diagram representing an exemplary overview of a computer-implemented process 100 for automatically processing coupons, according to an embodiment. A customer 110 who is shopping at a store operated by a retailer 120 presents one or more products, for example, products 102*a*, 102*b* and 102*c*, for purchase at a point of sale terminal 122. The products 102*a*, 102*b*, 102*c* may each have a corresponding barcode (e.g., a one- or two-dimensional barcode printed on the product packaging) for encoding a product code that uniquely identifies the product (e.g., a product stock keeping unit (SKU) number or manufacturer product code). The customer 110 also tenders, at the point of sale terminal 122, one or more coupons 104*a*, 104*b* and 104*c*, for example, paper coupons that are machine-readable by the point of sale terminal 122, or electronic coupons electronically transferred to the point of sale terminal 122 from an application executing on a mobile computing device. While, in some embodiments, at least some automated processing of the coupons 104*a*, 104*b*, 104*c* can occur at the point of sale terminal 122, the retailer 120 maintains a back office 124 for, among other things, performing further processing of the coupons 104*a*, 104*b*, 104*c* tendered at the point of sale terminal 122 (e.g., for performing certain post-sales transaction activities).

The coupons 104*a*, 104*b*, 104*c* include at least one barcode for encoding a coupon code representing the coupon, such as coupon type, manufacturer identification, redemption value and expiration date, among other types of information. For example, the barcodes may be encoded according to a standard such as Global Standard 1 (GS1) or Universal Product Code (UPC) Version A (UPC-A); other barcode formats may also be supported, including one-dimensional barcodes or two-dimensional barcodes (e.g., Quick Response Codes or QR codes). The point of sale terminal 122 includes a computerized register or terminal capable of reading the barcodes for the product 102a, 102b, 102c and coupon 104a, 104b, 104c (e.g., electronically scanning or transferring data), as will be understood by one of skill in the art. One example of a computerized point of sale terminal 122 is illustrated and described in connection with FIG. 4.

An electronic data path 106 represents the flow of barcode information from the products 102a, 102b, 102c and the coupons 104a, 104b, 104c to the point of sale terminal 122. It will be understood that in some embodiments, any number of products 102a, 102b, 102c and/or coupons 104a, 104b, 104c may be processed at the point of sale terminal 122. Although during some sales transactions there is at least one product 102a, 102b, 102c purchased for each coupon 104a, 104b, 104c tendered, in some other sales transactions, for example, multiple products may be purchased using a single coupon (e.g., buy one product, get another product free or at a discount with coupon) or multiple coupons may be redeemed for one or more products.

In some embodiments, the point of sale terminal 122 electronically transmits and receives data 126 (directly or indirectly) representing the products 102a, 102b, 102c and coupons 104a, 104b, 104c to and from the back office 124, a coupon validation service 130 and/or a clearing house 140 over one or more communication channels 128. The coupon validation service 130 provides the retailer 120 with electronic coupon validation data 132 including coupon codes representing fraudulent coupons (also referred to herein as fraudulent coupon codes) via a communication channel 134. The respective coupon codes of the tendered coupons 104a, 104b, 104c can be automatically checked, at the point of sale, against the fraudulent coupon codes to determine whether any of the coupons 104a, 104b, 104c are fraudulent or counterfeit. Fraudulent or counterfeit coupons can be identified as invalid, rejected by the retailer at the point of sale and returned to the customer 110. As used herein, the term identify or identified generally refers to a computer-implemented process of associating or assigning a qualifier or flag (e.g., valid, invalid, expired, fraudulent, etc.) electronically to the coupon. Such a qualifier may be stored in a memory or database operatively connected to the computer implementing the qualifier associating or assigning process (e.g., a point of sale terminal or back office computer system).

In some embodiments, the electronic coupon validation data 132 can further include coupon codes representing valid coupons (also referred to herein as valid coupon codes). The tendered coupons 104a, 104b, 104c can be automatically checked, at the point of sale, against the valid coupon codes to determine whether any of the coupons 104a, 104b, 104c are valid. Valid coupons can be identified as accepted, and accordingly accepted by the retailer at the point of sale provided that any other conditions for redemption are satisfied (e.g., matching product, un-expired coupon, etc.). For example, if a coupon 104a, 104b, 104c is identified as accepted but does not meet one or more conditions for redemption (e.g., the products 102a, 102b, 102c do not match any of the products for which the coupons 104a, 104b, 104c are redeemable), the coupon 104a, 104b, 104c should be returned to the customer 110 at the conclusion of the sales transaction or at any point before conclusion of the sales transaction.

The data 126 representing the coupon codes for coupons 104a, 104b, 104c identified as accepted can be sent to the back office 124 of the retailer 120. The back office 124 includes one or more systems configured to further process the accepted coupons 104a, 104b, 104c, for example, for performing accounting, auditing and other business functions. The back office 124 may be connected through a communication network 144 to a clearing house 140 for electronically transmitting processed coupon data 142 to the clearing house 140.

Figure 2A:
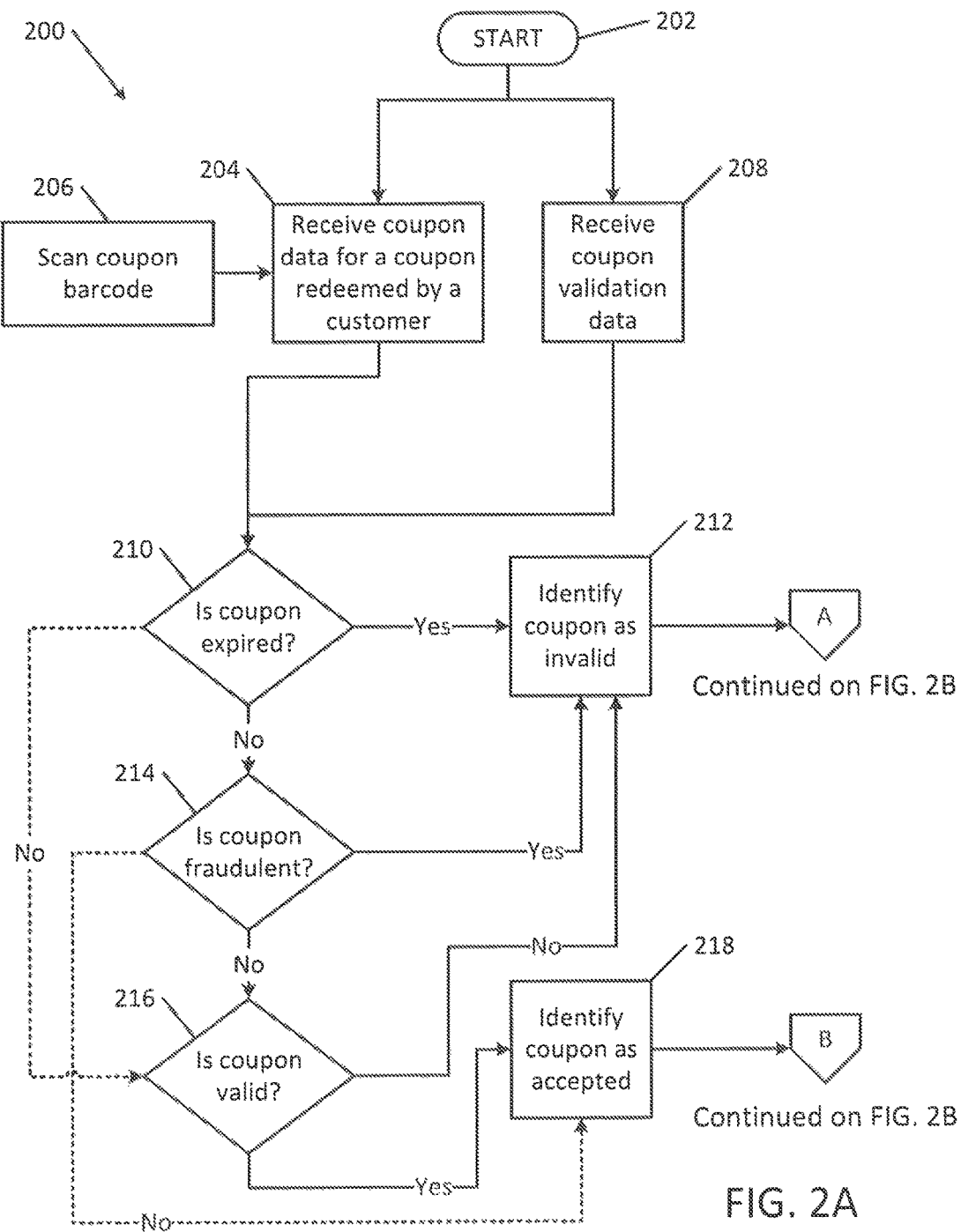
FIGS. 2A and 2B depict a flow diagram of an exemplary computer-implemented process for automatically processing a coupon in accordance with some embodiments.
Figure 2B:
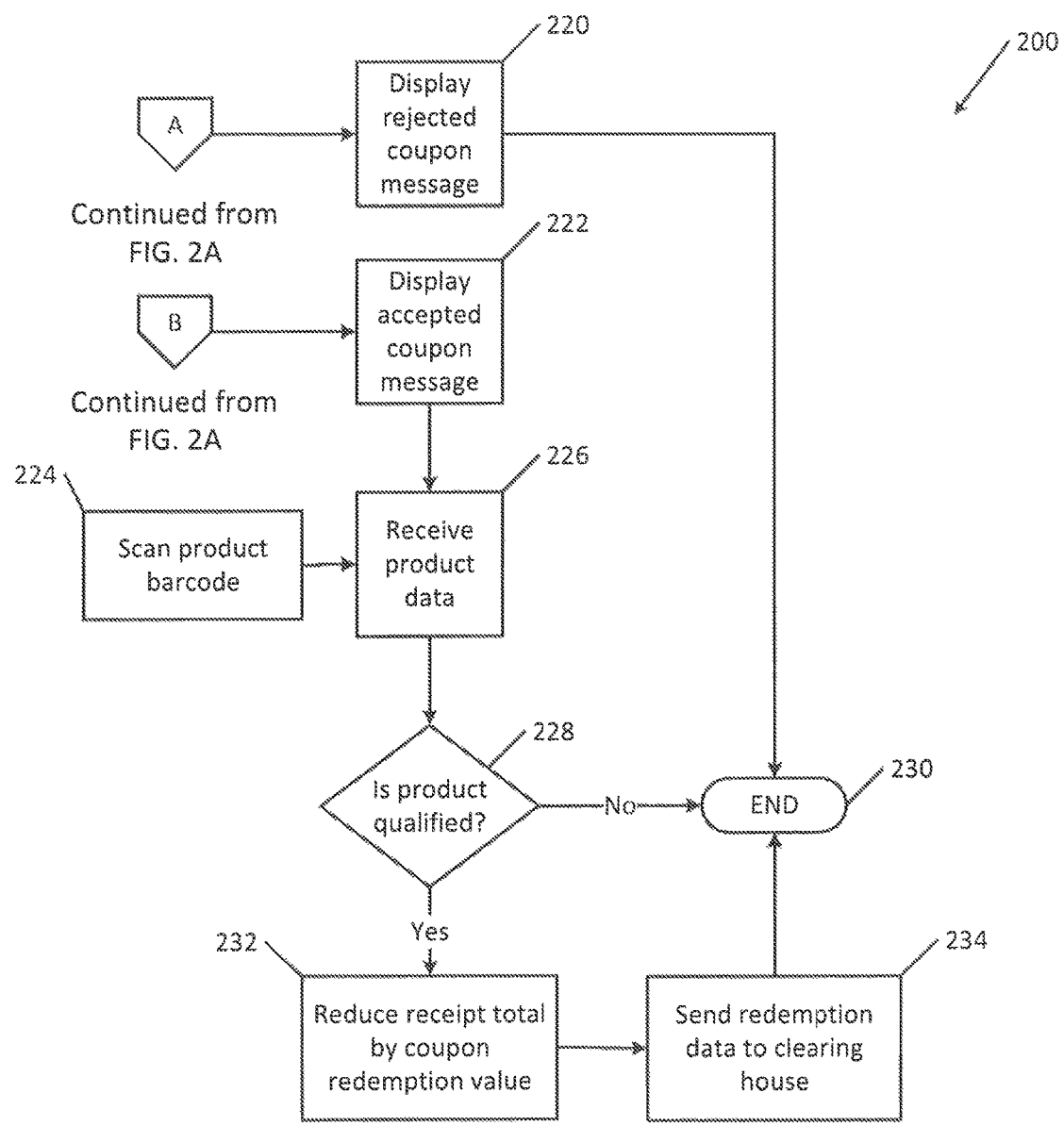

FIGS. 2A and 2B depict a flow diagram of an exemplary computer-implemented process 200 for automatically processing a coupon, according to an embodiment. Referring to FIG. 2A, process 200 begins at step 202. At step 204, coupon data for a coupon being redeemed by a customer is received at a point of sale. For example, the step of receiving the coupon data 204 may occur in response to scanning a coupon barcode at the point of sale (step 206) using a terminal configured to optically scan barcodes printed on the paper coupons 104a, 104b, 104c. Scanning the barcode is one exemplary technique for entering coupon data associated with the coupon into the point of sale. It will be understood that other techniques for entering the coupon data may be used, such as manually keying or typing a barcode number printed on the coupon into the point of sale using a keyboard or other data entry device, or electronically processing an image of an electronic coupon transferred from a mobile computing device.

At step 208, coupon validation data is received at the point of sale. As described above, the coupon validation data may be provided by a coupon validation service 130 and can include valid coupon codes and/or fraudulent coupon codes for checking against the redeemed coupons 104a, 104b, 104c. Step 208 may occur before, after, or concurrently to steps 204 and/or 206. For example, the coupon validation data may be received at the point of sale once at the beginning of each day, at the beginning of the sales transaction, or at other intervals or frequencies for keeping the coupon validation data current and available at the point of sale.

At step 210, the coupon data is checked to determine whether the coupon has expired (i.e., whether the current date is later than the coupon expiration date). Depending on the type of barcode on the coupon, the coupon data may not contain the expiration data (e.g., UPC-A barcodes may not contain the expiration date, but GS-1 barcodes may contain the expiration date.) If the coupon data contains the expiration date and the coupon is expired, the coupon is identified as invalid at step 212. If the coupon data does not contain the expiration date, the expiration date printed on the face of the coupon may be checked manually by a clerk at the point of sale.

If the coupon is not expired, at step 214, the coupon data is checked to determine whether the coupon is fraudulent. One or more pieces of information encoded in the barcode, such as the coupon type, manufacturer identification, family code and/or value code, can be checked against the coupon validation data to determine whether the coupon is fraudulent. For example, the coupon validation data may contain fraudulent values or coupon codes corresponding to one or more of the pieces of information encoded in the barcode. The fraudulent values or coupon codes may be determined by the coupon validation service or the retailer and included in the coupon validation data. If the coupon data for the redeemed coupon 104a, 104b, 104c matches one or more of the fraudulent values or coupon codes, the coupon is identified as invalid at step 212. In some embodiments, other information or combinations of information in the coupon data can also be used to determine whether the coupon is fraudulent. For example, coupons that have correct coupon types, manufacturer identifications, family codes and/or value codes, but incorrect expiration dates, may be fraudulent and accordingly identified as invalid.

If the coupon is not fraudulent, at step 216, the coupon data is checked to determine whether the coupon is valid. One or more pieces of information encoded in the barcode, such as the coupon type, manufacturer identification, family code and/or value code, can be checked against the coupon validation data to determine whether the coupon is valid. For example, the coupon validation data may contain values corresponding to one or more of the pieces of information encoded in the barcode which were determined to be valid by the coupon validation service or the retailer. If the coupon data for the redeemed coupon 104a, 104b, 104c matches one or more of the valid values, the coupon is identified as accepted at step 218, otherwise, the coupon is identified as invalid at step 212.

In some embodiments, step 214 or step 216 may not be performed in process 200. For example, if a redeemed coupon 104a, 104b, 104c is not expired and not fraudulent, the coupon may be identified as accepted at step 218, bypassing step 216. In another example, if a redeemed coupon 104a, 104b, 104c is valid and not expired, the coupon may be identified as accepted at step 218, bypassing step 214.

Referring to FIG. 2B, in some embodiments, if the coupon is identified as invalid, at step 220, a message can be displayed at the point of sale indicating to the clerk and/or customer that the coupon is rejected. If the coupon is identified as valid, at step 222, a message can be displayed at the point of sale indicating to the clerk and/or customer that the coupon is accepted.

As discussed above, some coupons can only be redeemed in conjunction with the purchase of one or more products. At step 226, product data for a product being purchased by a customer is received at a point of sale. For example, the step of receiving the product data 226 may occur in response to scanning a product barcode at the point of sale (step 224) using the terminal configured to optically scan barcodes printed on the products 102a, 102b, 102c. Scanning the barcode is one exemplary technique for entering product data associated with the product into the point of sale. It will be understood that other techniques for entering the product data may also be used, such as manually keying or typing a barcode number printed on the product packaging into the point of sale using a keyboard or other data entry device.

Products purchased by the customer for which coupons may be redeemed are referred to as qualified products. For example, if the customer tenders a coupon for Brand A detergent, 28 ounces or larger, and purchases Brand A detergent—32 ounces, the 32-ounce Brand A detergent product is a qualified product because it satisfies the coupon redemption conditions (i.e., correct brand, product and size). By contrast, for example, if the customer purchases Brand A detergent—21 ounces, the 21-ounce Brand A detergent product is not a qualified product because it does not satisfy the coupon redemption conditions (i.e., correct brand and product, but incorrect size). In some instances, coupon redemption conditions may require more than one qualified product to be purchased. For example, if the customer tenders a coupon for "buy-one-get-one" Brand A detergent, the customer must purchase (or present at the point of sale) at least two Brand A detergent products to qualify under the coupon redemption conditions.

At step 228, the product corresponding to the product data is checked against the coupon data to determine whether the product is a qualified product. If the product (or products, if more than one product must be purchased under the coupon redemption conditions) is a qualified product, a receipt total is reduced by the coupon redemption value at step 232. For example, if the coupon redemption value is 50 cents, the receipt total is reduced by 50 cents. In some embodiments, the coupon redemption value is automatically calculated based on the coupon data (e.g., the redemption value is encoded into the coupon barcode).

At step 234, redemption data for each redeemed coupon is electronically transmitted from the point of sale to the clearing house 140 (e.g., via the back office 124). The redemption data includes the coupon redemption value for the redeemed coupon. The redemption data may be used, for example, by the retailer to recover the coupon redemption value from the issuer of the coupon (e.g., the manufacturer or distributor of the qualified product) via the clearing house. Process 200 ends at step 230. In some embodiments, process 200 can be repeated one or more times for each coupon tendered by the customer at the point of sale. In some embodiments, step 234 is performed subsequent to completion of the sales transaction, that is, after the customer has tendered all of the coupons he or she wishes to redeem.

Figure 3:
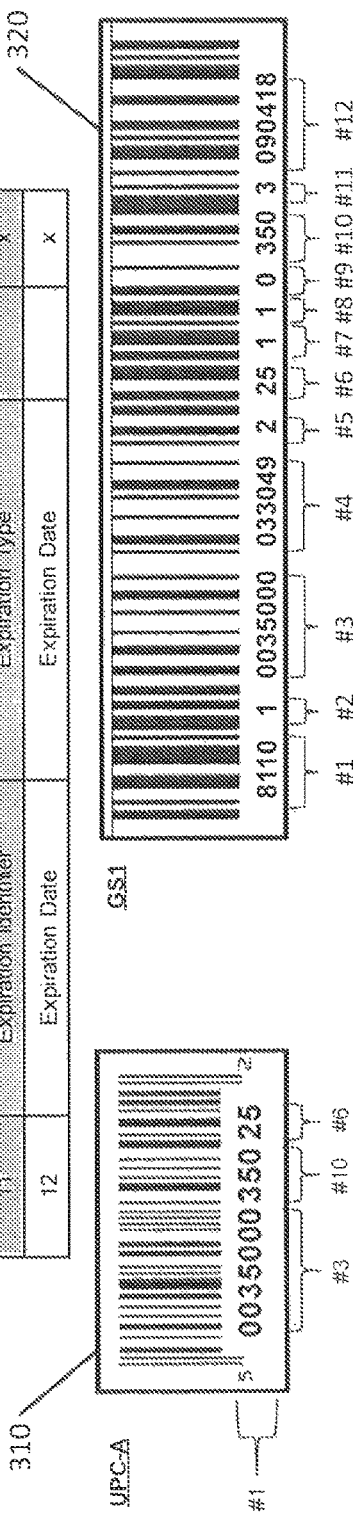
FIG. 3 depicts examples of various barcodes that can be used in conjunction automatically processing coupons in accordance with some embodiments.

FIG. 3 depicts examples of various coupon barcodes that can be used in conjunction with automatically processing coupons in accordance with some embodiments, including the process 200 of FIGS. 2A and 2B. One type of barcode is called a UPC-A barcode 310, and another type of barcode is called a GS-1 barcode 320. The UPC-A barcode 310 and GS-1 barcode 320 are each barcodes in which certain information may be encoded, such as the coupon type, the manufacturer identification, a family code and a value code. Generally, the GS-1 barcode 320 includes more information than the UPC-A barcode 310. Some coupons may have only one barcode, while others may have multiple different barcodes, any or all of which may be used in conjunction with exemplary embodiments. Chart 330 lists the various types of information that can be encoded in the UPC-A barcode 310 and/or GS-1 barcode 320 by reference to the "#" numbers. For example, the value "0035000" indicated by reference #3 in the exemplary barcodes 310 and 320 of FIG. 3 is the manufacturer ID for the coupon bearing either or both of the barcodes.

Figure 4:
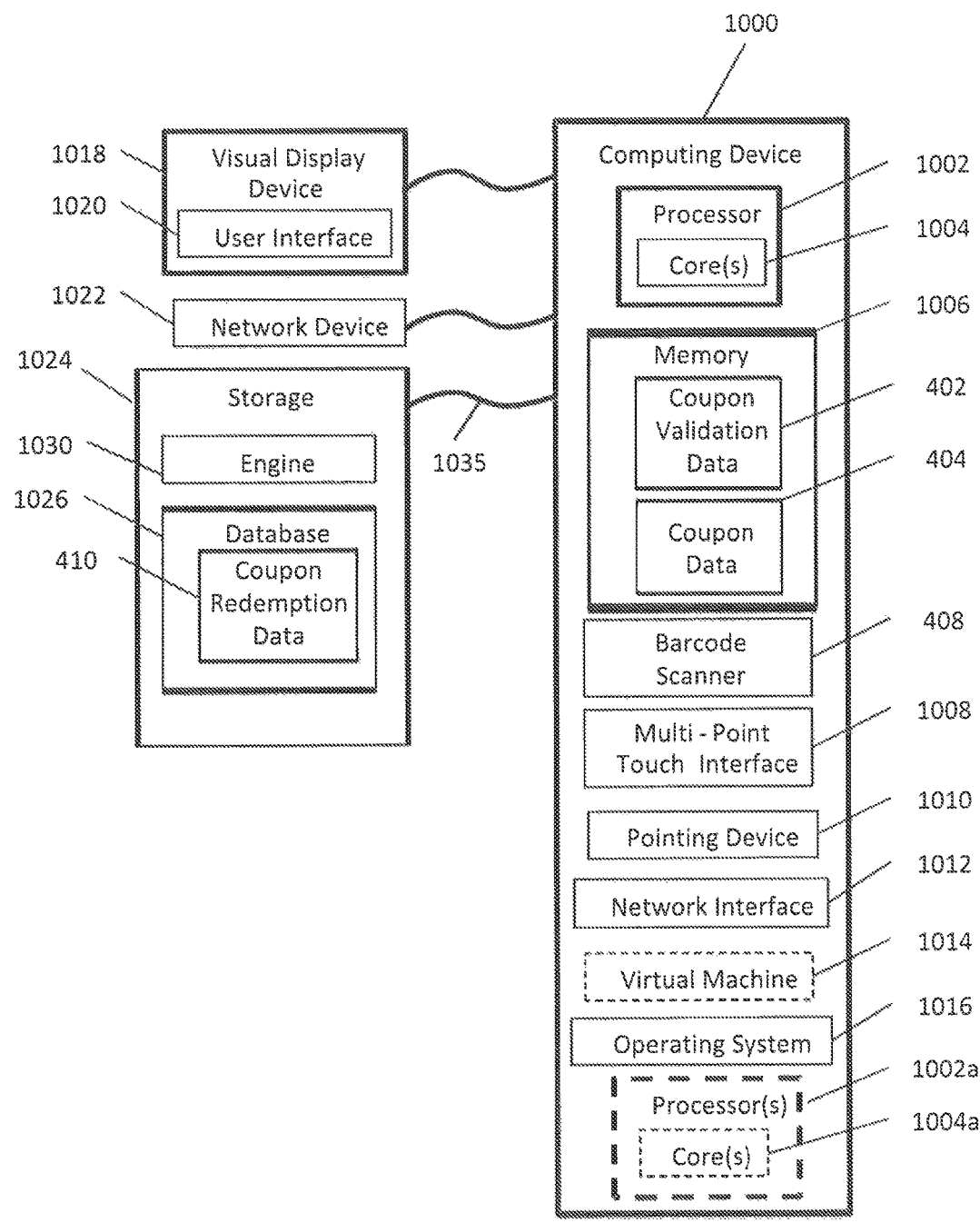
FIG. 4 is a block diagram of an example of a system for carrying out one or more embodiments.

FIG. 4 is a block diagram of an exemplary computing device 1000 that may be used to implement exemplary embodiments described herein. In some embodiments, the computing device 1000 is included in a retail point of sale terminal, back office system and/or other computing resource. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the computing device 1000 may store non-transitory computer-readable and computer-executable instructions or software for implementing exemplary embodiments, such as process 200 of automatically processing coupons, coupon validation data 402 and/or coupon data 404 associated with redeemed coupons. The computing device 1000 also includes configurable and/or programmable processor 1002 and associated core 1004, and optionally, one or more additional configurable and/or programmable processor(s) 1002*a* and associated core(s) 1004*a* (for example, in the case of computer systems having multiple processors/cores), for executing non-transitory computer-readable and computer-executable instructions or software stored in the memory 1006 and other programs for controlling system hardware. Processor 1002 and processor(s) 1002*a* may each be a single core processor or multiple core (1004 and 1004*a*) processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof.

A user may interact with the computing device 1000 through a visual display device 1018, such as a computer monitor or touch screen display integrated into the computing device 1000, which may display one or more user interfaces 1020 (e.g., the user interface 136 of FIG. 1) that may be provided in accordance with exemplary embodiments. The computing device 1000 may include other I/O devices for receiving input from a user, for example, a keyboard or any suitable multi-point touch interface 1008, a pointing device 1010 (e.g., a mouse). The keyboard 1008 and the pointing device 1010 may be coupled to the visual display device 1018. The computing device 1000 may include other suitable conventional I/O peripherals, for example, a barcode scanner or reader 408.

The computing device 1000 may also include one or more storage devices 1024, such as a hard-drive, CD-ROM, or other non-transitory computer-readable media, for storing data and non-transitory computer-readable instructions and/or software that implement exemplary embodiments described herein. The storage devices 1024 may be integrated with the computing device 1000. The computing device 1000 may communicate with the one or more storage devices 1024 via a bus 1035. The bus 1035 may include parallel and/or bit serial connections, and may be wired in either a multi-drop (electrical parallel) or daisy-chain topology, or connected by switched hubs, as in the case of USB. Exemplary storage device 1024 may also store one or more databases 1026 for storing any suitable information required to implement exemplary embodiments. For example, exemplary storage device 1024 can store one or more databases 1026, including coupon redemption data 410, for storing information, such as product data, coupon code data, coupon validation data and/or any other information. The storage device 1024 can also store a coupon engine 1030 including logic and programming for receiving the product codes and/or coupon codes and processing the coupons based on the product codes and/or coupon codes, for performing one or more of the exemplary methods disclosed herein.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 may be any computer system, such as a point of sale terminal (employee-assisted register and/or customer self-service kiosk), workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Figure 5:
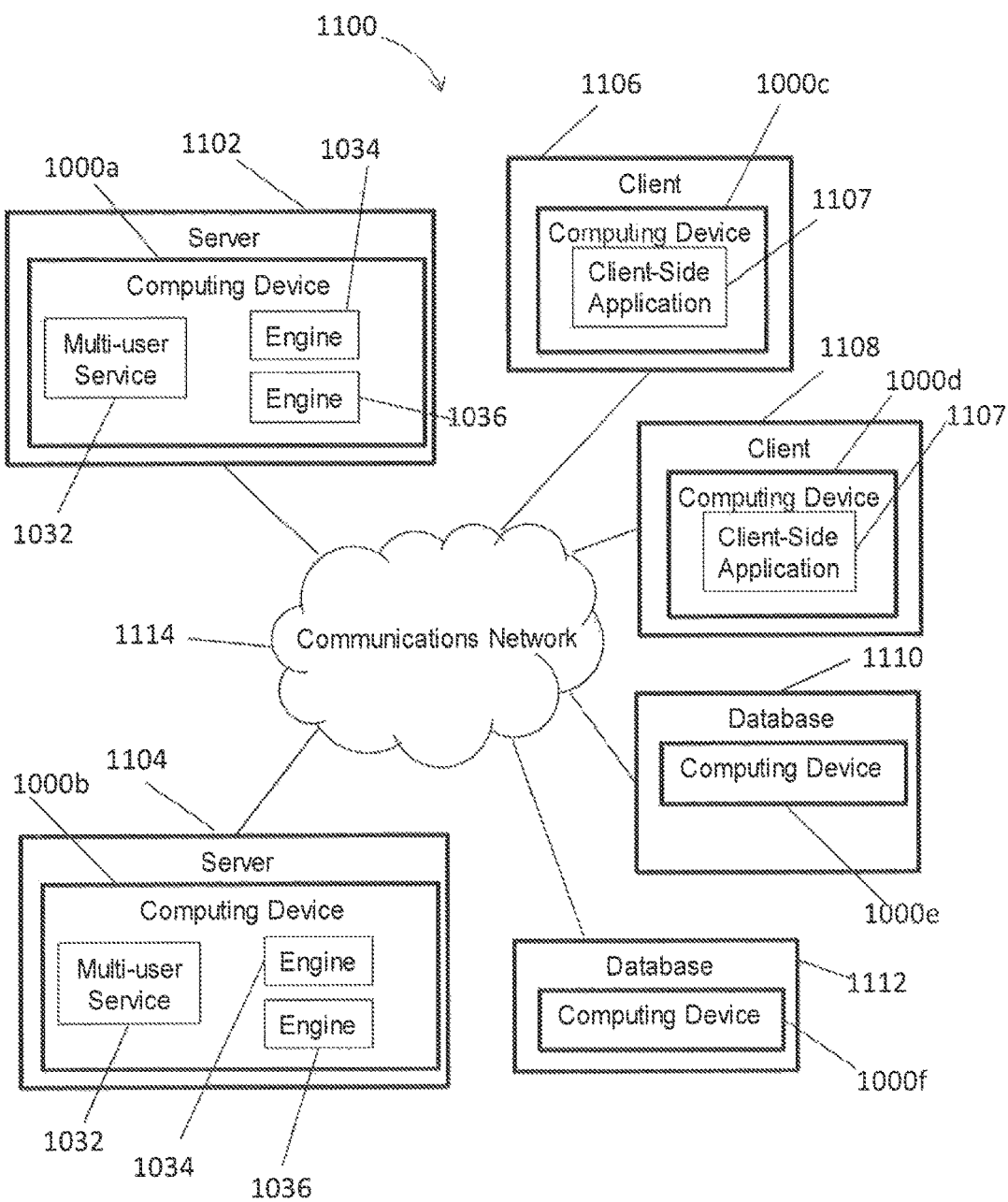
FIG. 5 is a block diagram of an exemplary client-server environment for implementing one or more embodiments.

FIG. 5 is a block diagram of an exemplary network environment 1100 suitable for a distributed implementation of exemplary embodiments. The network environment 1100 may include one or more servers 1102 and 1104, one or more clients 1106 and 1108, and one or more databases 1110 and 1112, each of which can be communicatively coupled via a communication network 1114, such as the network 120 of FIG. 1. The servers 1102 and 1104 may take the form of or include one or more computing devices 1000*a* and 1000*b*, respectively, that are similar to the computing device 1000 illustrated in FIG. 4. The clients 1106 and 1108 may take the form of or include one or more computing devices 1000*c* and 1000*d*, respectively, that are similar to the computing device 1000 illustrated in FIG. 4. For example, clients 1106 and 1108 may include mobile user devices. Similarly, the databases 1110 and 1112 may take the form of or include one or more computing devices 1000*e* and 1000*f*, respectively, that are similar to the computing device 1000 illustrated in FIG. 4. While databases 1110 and 1112 have been illustrated as devices that are separate from the servers 1102 and 1104, those skilled in the art will recognize that the databases 1110 and/or 1112 may be integrated with the servers 1102 and/or 1104 and/or the clients 1106 and 1108.

The network interface 1012 and the network device 1022 of the computing device 1000 enable the servers 1102 and 1104 to communicate with the clients 1106 and 1108 via the communication network 1114. The communication network 1114 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 1114 are capable of supporting distributed implementations of exemplary embodiments.

In exemplary embodiments, one or more client-side applications 1107 may be installed on client 1106 and/or 1108 to allow users of client 1106 and/or 1108 to access and interact with a multi-user service 1032 installed on the servers 1102 and/or 1104. For example, the users of client 1106 and/or 1108 may include users associated with an authorized user group and authorized to access and interact with the multi-user service 1032. In some embodiments, the servers 1102 and 1104 may provide client 1106 and/or 1108 with the client-side applications 1107 under a particular condition, such as a license or use agreement. In some embodiments, client 1106 and/or 1108 may obtain the client-side applications 1107 independent of the servers 1102 and 1104. The client-side application 1107 can be computer-readable and/or computer-executable components or products, such as computer-readable and/or computer-executable components or products for presenting a user interface for a multi-user service. One example of a client-side application is a point of sale application configured to automatically process coupons, hosted by the server 1102 and/or the server 1104, which may provide access to the multi-user service. Another example of a client-side application is a mobile application (e.g., a smart phone or tablet application) that can be installed on client 1106 and/or 1108 and can be configured and/or programmed to access a multi-user service implemented by the server 1102 and/or 1104. The servers 1102 and 1104 can also provide one or more engines 1034, 1036 including logic and programming for receiving the product codes and/or coupon codes and processing the coupons based on the product codes and/or coupon codes, for performing one or more of the exemplary methods disclosed herein.

The databases 1110 and 1112 can store user information, product data, coupon code data, coupon validation data, coupon redemption data and/or any other information suitable for use by the multi-user service 1032. The servers 1102 and 1104 can be programmed to generate queries for the databases 1110 and 1112 and to receive responses to the queries, which may include information stored by the databases 1110 and 1112.

Having thus described several exemplary embodiments of the disclosure, it is to be appreciated various alterations, modifications, and improvements will readily occur to those skilled in the art. Accordingly, the foregoing description and drawings are by way of example only.

What is claimed is:

1. A method implemented in a distributed computing system, the method comprising:
    reading, by a coupon code reader operatively coupled to a first one of a plurality of computing systems in communication with a second one of the plurality of computing systems via a first network, electronic coupon data representing a machine-readable coupon code associated with a coupon presented by a customer at the point of sale terminal, wherein the coupon is issued by a third party issuer system and the machine-readable coupon includes a plurality of sections, each section storing a different type of information;
    determining, via the first one of the plurality computing systems, the type of information stored in each of the sections;
    receiving, at the first one of the plurality of computing systems, coupon validation data including, a list of invalid and valid coupon codes from a coupon validation system, wherein the first one of the plurality of computing systems receives updated coupon validation data after a specified time interval;
    comparing, via the first one of the plurality of computing systems, information stored in at least one section of the plurality of sections of the machine-readable coupon code to the list of invalid and valid coupon codes;
    identifying, via the first one of the plurality of computing systems, the coupon as accepted in response to at least one of: a presence of the coupon code list of valid coupon codes or an absence of the coupon from the list of invalid coupon codes;
    identifying, via the first one of the plurality of computing systems, the coupon as invalid in response to at least one of: a presence of the coupon code in the list of invalid coupon codes or an absence of the coupon code from the list of valid coupon codes;
    comparing information stored in a combination of sections of the coupon with the coupon validation data;
    identifying, via the first one of the plurality of computing systems, the coupon as fraudulent based on the information stored in the combination of sections of the coupon with the coupon validation data;
    storing, via the first one of the plurality computing systems, a qualifier associated with the coupon indicating the coupon as valid, invalid, or fraudulent, in a database coupled to the first one of the plurality of computing systems;
    transmitting the qualifier from the first one of the plurality of computing systems to the coupon validation system, the coupon validation system storing the qualifier;
    placing, via the coupon validation system, the coupon code in the list of invalid and valid coupon codes based on the qualifier to create an updated list of invalid and valid coupon codes;
    determining, via the first one of the plurality of computing systems, a redemption value of the coupon in response to identifying the coupon as valid;
    transmitting the redemption value from the first one of the plurality of computing systems to the second one of the plurality of computing systems, via the first network
    transmitting, via the second one of the plurality of computing systems, the redemption value to a remote clearing house system via a the second network, separate and distinct from the first network;
    collecting, via the remote clearing house system, a redemption value for the coupon from the third party issuer system; and
    distributing the updated list of invalid and valid coupon codes to each of the plurality of computing systems to facilitate decentralized validation of coupon codes.

2. The method of claim 1, wherein an expiration date is associated with the coupon, and wherein the method further comprises:
    comparing, via the first one of the plurality of computing systems, the expiration date to a current date;
    identifying, via the first one of the plurality of computing systems, the coupon as accepted in response to the current date being not later than the expiration date; and
    identifying, via the first one of the plurality of computing systems, the coupon as invalid in response to the current date being later than the expiration date.

3. The method of claim 1, wherein the point of sale terminal further includes an operator display operatively coupled to the via the first one of the plurality of computing systems; and
    wherein the method further comprises:
        displaying, via the operator display, a message indicating that the coupon is accepted in response to identification of the coupon as accepted; and displaying, via the operator display, a message indicating that the coupon is rejected in response to identification of the coupon as invalid.

4. The method of claim 1, wherein the coupon code includes a qualified product code and a coupon redemption value; and
wherein the method further comprises:
reading, by a product code reader operatively coupled to the first one of the plurality of computing systems, electronic product data representing a product code associated with a product to be purchased by the customer;
comparing, via the first one of the plurality of computing systems, the product code to the qualified product code;
identifying, via the first one of the plurality of computing systems, the product as qualified in response to the product code matching the qualified product code;
identifying, via the first one of the plurality of computing systems, the product as disqualified in response to the product code not matching the qualified product code; and
reducing, via the first one of the plurality of computing systems, a receipt total by the coupon redemption value in response to identification of the coupon as accepted and the product as qualified.

5. The method of claim 1, wherein the coupon code reader is a barcode reader operatively coupled to the first one of the plurality of computing systems, the method further comprising electronically scanning, using the barcode reader, a barcode in which the coupon code is encoded.

6. The method of claim 5, wherein the barcode includes at least one of a UPC-A barcode and a GS1 barcode.

7. A coupon processing system, implemented in a distributed computing system, the system comprising:
at least a first one of a plurality of computing systems including a processor, a database, and operatively coupled to a coupon code reader in communication with a second one of the plurality of of the plurality of computing systems via a first network, the first one of the plurality computing systems programmed to:
read, by the coupon code reader, electronic coupon data representing a machine-readable coupon code associated with a coupon presented by a customer at the point of sale terminal, wherein the coupon is issued by a third party issuer system and the machine-readable coupon includes a plurality of sections, each section storing a different type of information;
determine the type of information stored in each of the sections;
receive coupon validation data including a list of valid and invalid coupon codes from a coupon validation system, wherein the first one of the plurality of computing systems receives updated coupon validation data after a specified time interval;
compare information stored in at least one section of the plurality of sections of the machine-readable coupon code to the list of valid and invalid coupon codes;
identify the coupon as accepted in response to at least one of: a presence of the coupon code in the list of valid coupon codes or an absence of the coupon from the list of invalid coupon codes; and
identify the coupon as invalid in response to at least one of: a presence of the coupon code in the list of invalid coupon codes or an absence of the coupon code from the list of valid coupon codes;
compare information stored in a combination of sections of the coupon with the coupon validation data;
identify the coupon as fraudulent based on the information stored in the combination of sections of the coupon with the coupon validation data;
store a qualifier associated with the coupon indicating the coupon as valid invalid, or fraudulent, in the database;
transmit the qualifier associated with the coupon and the machine-readable coupon code associated with the coupon to the coupon validation system;
determine a redemption value of the coupon in response to identifying the coupon as valid;
transmit the redemption value to the second one of the plurality of computing systems, via the first network
wherein the second one of the plurality of computing system is configured to transmit the redemption value to the remote clearing house system, via a second network, separate and distinct from the first network;
wherein the remote clearing house system is programmed to, collect the redemption value from the third party issuer system,
wherein the coupon validation system is programmed to store the qualifier, place the coupon codes in the list of valid and invalid coupon codes based on the qualifier and distribute the updated list of invalid and valid coupon codes to each of the plurality of computing systems to facilitate decentralized validation of coupon codes.

8. The system of claim 7, wherein the coupon code includes an expiration date of the coupon; and
wherein the first one of the plurality of computing systems is programmed to:
compare the expiration date to a current date;
identify the coupon as accepted in response to the current date being not later than the expiration date; and
identify the coupon as invalid in response to the current date being later than the expiration date.

9. The system of claim 7, wherein the system further comprises an operator display operatively coupled to the first one of the plurality of computing systems; and
wherein the first one of the plurality of computing systems is programmed to:
display, via the operator display, a message indicating that the coupon is accepted in response to identification of the coupon as accepted; and
display, via the operator display, a message indicating that the coupon is rejected in response to identification of the coupon as invalid.

10. The system of claim 7, wherein the coupon code includes a qualified product code and a coupon redemption value;
wherein the first one of the plurality of computing systems is operatively coupled to a product code reader; and
wherein the first one of the plurality of computing systems is programmed to:
read, using the product code reader, electronic product data representing a product code associated with a product to be purchased by the customer;
compare the product code to the qualified product code;
identify the product as qualified in response to the product code matching the qualified product code;

identify the product as disqualified in response to the product code not matching the qualified product code; and reduce a receipt total by the coupon redemption value in response to identification of the coupon as accepted and the product as qualified.

11. The system of claim 7 wherein the coupon code reader is a barcode reader operatively coupled to the processor,
wherein the first one of the plurality of computing systems is programmed to scan, using the barcode reader, a barcode in which the coupon code is encoded.

12. The system of claim 11, wherein the barcode includes at least one of a UPC-A barcode and a GS1 barcode.

13. A non-transitory computer-readable medium having stored thereon non-transitory computer-executable instructions that when executed cause a processor to:

read, by a coupon code reader operatively coupled to the at least a first one of a plurality of computing systems in communication with a second one of the plurality of computing systems via a first network, electronic coupon data representing a machine-readable coupon code associated with a coupon presented by a customer at the point of sale terminal, wherein the coupon is issued by a third party issuer system and the machine-readable coupon includes a plurality of sections, each section storing a different type of information;

determine the type of information stored in each of the sections;

receive, via the first one of the plurality computing systems, coupon validation data including a list of valid and invalid coupon codes from a coupon validation system, wherein the first one of the plurality of computing systems receives updated coupon validation data after a specified time interval;

compare, via the first one of the plurality computing systems, information stored in at least one section of the plurality of sections of the machine-readable coupon code to the list of valid and invalid coupon codes;

identify, via the first one of the plurality computing systems, the coupon as accepted in response to at least one of: a presence of the coupon code in the list of valid coupon codes or an absence of the coupon from the list of invalid coupon codes;

identify, via the first one of the plurality computing systems, the coupon as invalid in response to at least one of: a presence of the coupon code in the list of invalid coupon codes or an absence of the coupon code from the list of valid coupon codes;

compare information stored in a combination of sections of the coupon with the coupon validation data identify, via the first one of the plurality computing systems, the coupon as fraudulent based on the information stored in the combination of sections of the coupon with the coupon validation data;

store a qualifier associated with the coupon indicating the coupon as valid invalid, or fraudulent, in the database;

store, via the first one of the plurality computing systems, a qualifier associated with the coupon indicating the coupon as valid or invalid;

transmit the qualifier from the first one of the plurality of computing systems to the coupon validation system, the coupon validation system storing the qualifier;

place, via the coupon validation system, the coupon code in the list of invalid and valid coupon codes based on the qualifier to create an updated list of invalid and valid coupon codes;

determine, via the first one of the plurality computing systems, a redemption value of the coupon in response to identifying the coupon as valid;

transmit the redemption value from the first one of the plurality computing systems to the second one of the plurality of computing systems, via the first network transmit, via the second one of the plurality of computing systems to a remote clearing house system via a second network, via a second network, separate and distinct from the first network;

collect, via the remote clearing house system, a redemption value for the coupon from the third party issuer system; and distribute the updated list of invalid and valid coupon codes to each of the plurality of computing systems to facilitate decentralized validation of coupon codes.

\* \* \* \* \*

UNITED STATES PATENT AND TRADEMARK OFFICE
CERTIFICATE OF CORRECTION

PATENT NO. : 10,453,090 B2
APPLICATION NO. : 13/755844
DATED : October 22, 2019
INVENTOR(S) : Mindy Rector, Brenda Deal and Cynthia Marie Scholtes Kennedy Page 1 of 1

It is certified that error appears in the above-identified patent and that said Letters Patent is hereby corrected as shown below:

In the Claims

> Claim 1, Column 11, Line 57: after "plurality" insert -- of --.
> Claim 1, Column 12, Line 20: after "plurality" insert -- of --.
> Claim 1, Column 12, Line 41: after "a" delete "the".
> Claim 7, Column 13, Line 41: delete "of the plurality of of the plurality" and insert -- of the plurality --, therefor.
> Claim 7, Column 13, Line 43: after "plurality" insert -- of --.
> Claim 7, Column 14, Line 9: after "valid" insert -- , --.
> Claim 13, Column 15, Line 29: after "plurality" insert -- of --.
> Claim 13, Column 15, Line 35: after "plurality" insert -- of --.
> Claim 13, Column 15, Line 39: after "plurality" insert -- of --.
> Claim 13, Column 16, Line 1: after "plurality" insert -- of --.
> Claim 13, Column 16, Line 8: after "plurality" insert -- of --.
> Claim 13, Column 16, Line 14: after "valid" insert -- , --.
> Claim 13, Column 16, Line 15: after "plurality" insert -- of --.
> Claim 13, Column 16, Line 25: after "plurality" insert -- of --.
> Claim 13, Column 16, Line 30: after "plurality" insert -- of --.

Signed and Sealed this
Twenty-fourth Day of November, 2020

Andrei Iancu
*Director of the United States Patent and Trademark Office*